June 23, 1925.  
W. J. SEITZ ET AL  
VEHICLE AXLE  
Filed Nov. 17, 1924  
1,543,452  
2 Sheets-Sheet 1
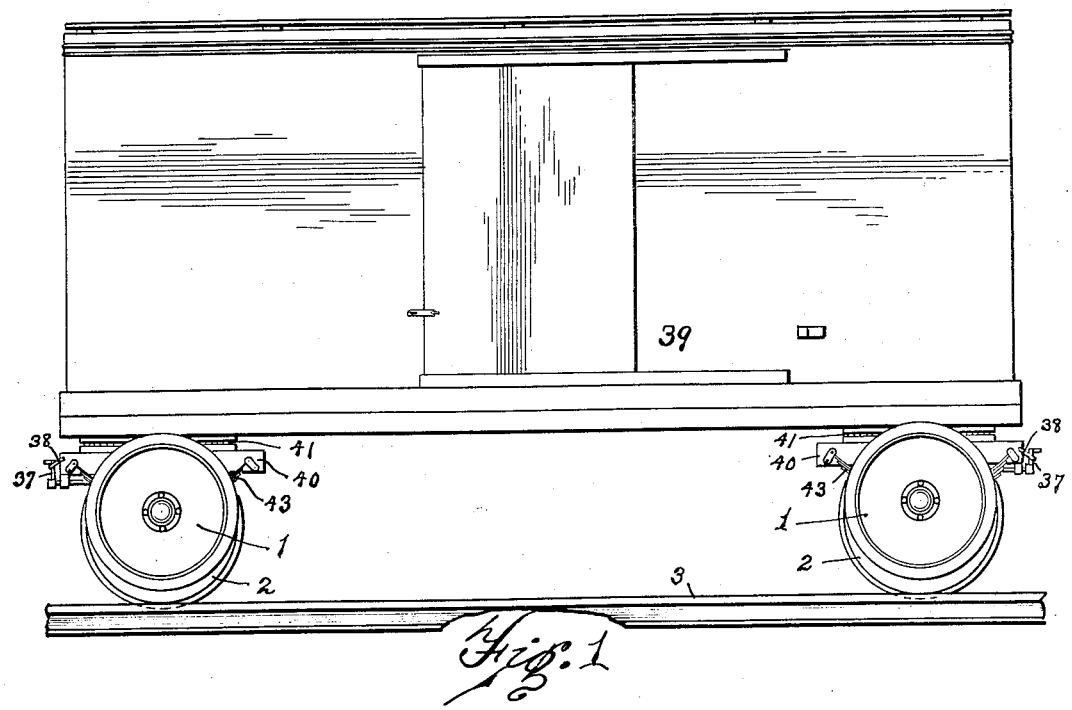
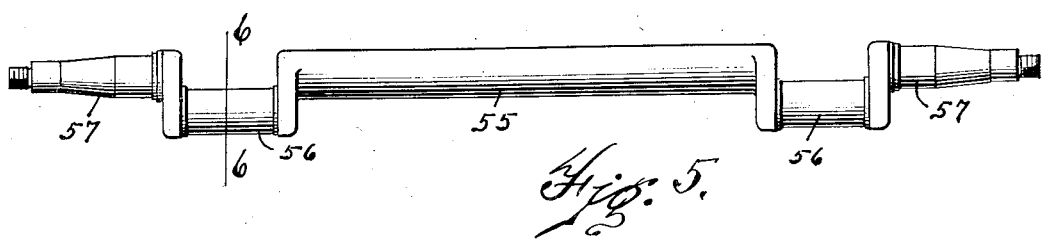
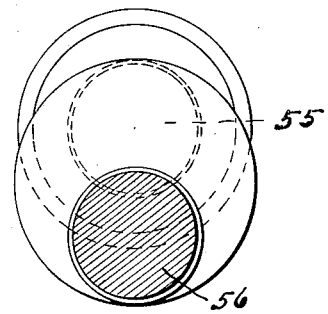
INVENTOR.
William J. Seitz & Calvin B. Seitz
BY Edward N. Pagelsen
ATTORNEY.

June 23, 1925.
W. J. SEITZ ET AL
VEHICLE AXLE
Filed Nov. 17, 1924
1,543,452
2 Sheets-Sheet 2
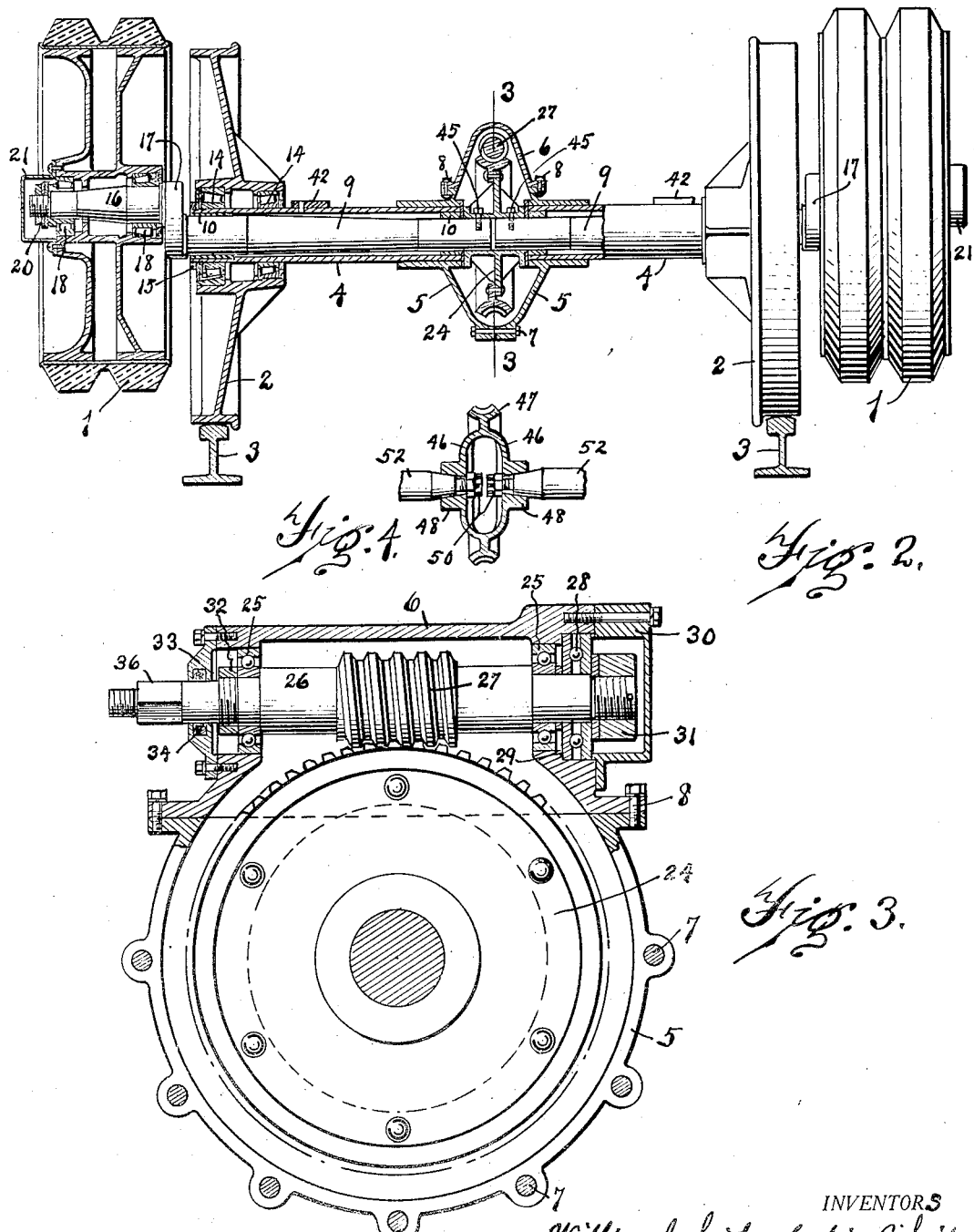
INVENTORS
William J. Seitz & Calvin B. Seitz
BY
Edward N. Pagelsen,
ATTORNEY.

Patented June 23, 1925.

1,543,452

UNITED STATES PATENT OFFICE.

WILLIAM J. SEITZ AND CALVIN B. SEITZ, OF DETROIT, MICHIGAN.

VEHICLE AXLE.

Application filed November 17, 1924. Serial No. 750,491.

*To all whom it may concern:*

Be it known that we, WILLIAM J. SEITZ and CALVIN B. SEITZ, citizens of the United States, and residents of Detroit, in the county of Wayne and State of Michigan, have invented a new and Improved Vehicle Axle, of which the following is a specification.

This invention relates to the construction of axles for vehicles, particularly for freight carrying trailers, and its object is to provide an axle construction which shall be equipped with two sets of wheels, one set adapted to run on standard rails and the other set adapted to run on ordinary roadways, the two sets being eccentric to each other.

Another object of this invention is to provide means for alternately shifting the track and roadway wheels to operative position.

A further object of this invention is to provide an axle construction of this character which shall be of sufficient strength to carry the desired loads when adapted to either tracks or roadways, which can be constructed at comparatively low cost, and which shall have long life.

This invention consists in the details of construction illustrated in the accompanying drawings and particularly pointed out in the claims.

In the drawings, Fig. 1 is a side elevation of a freight car equipped with our novel axles. Fig. 2 is a view, partly in elevation and partly in section, of this improved axle construction. Fig. 3 is a section on the line 3—3 of Fig. 2 on a larger scale. Fig. 4 is a vertical section of a modified form of driving worm wheel which connects the inner ends of the two parts of the axle. Fig. 5 is an elevation of a modified form of axle. Fig. 6 is a section on the line 6—6 of Fig. 5.

Similar reference characters refer to like parts throughout the several views.

The great improvements made in the country roads of the various States has stimulated motor freight traffic, taking away a large proportion of the business of the railways because the motor trucks can load at the factory of the shipper and deliver directly to the place of business of the consignee. These trucks carry upward of ten tons, but as each requires an engine and a driver the operating expense is quite high. Trailers have been used with motor trucks but these are often objectionable.

The present invention contemplates freight-carrying vehicles adapted to be loaded at the place of business of the shipper, hauled to the track of a steam or electric railway, united into trains, hauled to the nearest point on the railway to their destinations, and then hauled on the regular roadways to the place where they are to be unloaded. To adapt them for this purpose they are provided with axles equipped with one set of wheels 1 which are adapted for ordinary roadways and with a second set of wheels 2 adapted for the rails 3, these sets being eccentric to each other.

The structure shown in Fig. 2 embodies an axle casing comprising a pair of axle tubes 4 united by a three-part housing consisting of the two side members 5 and the cap 6, secured together by the bolts 7 and 8. Within the tubes 4 is the two-part axle 9, bearing sleeves 10 being provided for this axle within the tubes, plain bearings being sufficient as the axle is turned only occasionally.

The wheels 2 are mounted directly on the outer ends of the axle tubes 4, roller bearings 14 being provided and held in position by a nut 15 on the end of each tube. Stub-axles 16 in the form of crank pins extending outwardly from the crank disks 17 are in accurate alinement and carry roller bearings 18 for the road wheels 1. These bearings are adjusted by nuts 20 on the outer ends of the stub-axles and hub caps 21 prevent the entrance of dust. These bearings may all be of any desired construction.

By turning the axle one half rotation the road wheels 1 are positioned so that their lowest points will be either considerably above or below the lowest points of the flanges of the track wheels 2. To accomplish this, a worm-wheel 24 may be secured to the inner ends of the two parts of the axle. We prefer to form the web and teeth of this worm wheel detachable so that either can be replaced.

The cap 6 of the central housing is provided with the ball bearings 25 to support the shaft 26 of the worm 27 and with a thrust bearing 28 which is securely held between the shoulder 29 on the cap 6 and the end 30 thereof. A nut 31 on the shaft controls the adjustment of this thrust bearing and of the adjacent supporting bearing 25. The other bearing 25 is adjusted by the nut 32. A second end 33 prevents the entrance of dust and may be recessed to receive the packing ring 34.

The shaft 26 is shown squared at 36 to receive a crank 37 (Fig. 1) which is normally kept from turning by the latch 38 of any desired construction. This figure shows a freight car body 39 mounted on truck frames 40 and fifth wheels 41 are indicated between them. Ordinary truck springs 43 rest on saddles 42 on the axle tubes and carry the truck frame. As any desired type of draw-bars and draw-heads may be employed, none are shown.

In Fig. 4 a modified type of worm wheel is shown. In Fig. 2, the ends of the two parts of the axle are shown secured in position by set screws 45. The wheel shown in Fig. 4 has two diametrically opposed arms 46 connecting the hubs 48 to the rim 47. The spaces between these arms 46 permit access to the nuts 50 on the ends of the two parts 52 of the axle which parts are held in place by these nuts.

The one-piece axle 55 shown in Fig. 5 may be used instead of the two-piece axle shown in Fig. 2, but with such an axle, a split axle casing must be used and split bearings for the track wheels. The construction is not as desirable as that shown in Fig. 2. The split bearings for the track wheels will be mounted on the crank pins 56 and the road wheels will be mounted on the alined extensions 57 of the axle so that the two sets of wheels will again be eccentric to each other.

The details of construction and the proportions of the parts may all be changed by those skilled in the art without departing from the spirit of our invention as set forth in the following claims.

We claim:—

1. A vehicle axle construction comprising an axle casing, a track wheel mounted on the ends thereof, an axle rotatably mounted in said casing and having offset alined stub axles on the ends thereof, road wheels rotatably mounted on said stub axles, and means to rotate said axle.

2. A vehicle axle construction comprising an axle construction, an axle rotatably mounted therein, and two sets of wheels, one set adapted to run on rails and the other set adapted to run on roadways, said axle being formed with two alined offset portions on which one set of said wheels are mounted eccentric to the other set of wheels, and means to rotate the axle to elevate one set of said wheels and to lower the other set.

3. A vehicle axle construction comprising an axle casing, a track wheel mounted on each end thereof, a two-part axle rotatably mounted in said casing and having alined offset stub-axles at its ends, road wheels rotatably mounted on said stub-axles, a worm wheel attached to the adjacent ends of the two parts of the axle, a worm mounted in said casing in engagement with said worm wheel, and means to turn said worm.

4. A vehicle axle construction comprising an axle casing consisting of two axle tubes and a casing connecting the inner ends thereof, a track wheel rotatably mounted on the outer end of each tube, a two-part axle rotatably mounted in said tubes and having alined offset stub-axles at its ends, road wheels rotatably mounted on said stub-axles, a worm wheel attached to and connecting the adjacent ends of the two parts of the axle, a housing for the worm wheel comprising two connected parts attached to said tubes and a cap, a shaft rotatable in said cap and a worm on said shaft meshing with said worm wheel, and a crank on the end of the shaft to turn the worm, worm wheel and axle to elevate and lower the track wheels and the road wheels at will.

WILLIAM J. SEITZ.
CALVIN B. SEITZ.